US012737322B1

(12) United States Patent
Choudhary et al.

(10) Patent No.: US 12,737,322 B1
(45) Date of Patent: Sep. 15, 2026

(54) DISTRIBUTED DATA STORE FOR EFFICIENT SNAPSHOT MANAGEMENT USING COLLOCATED METADATA

(71) Applicant: Oracle International Corporation, Redwood Shores, CA (US)

(72) Inventors: Siddharth Choudhary, Belmont, CA (US); Dongqiao Ma, San Jose, CA (US); Jingtao Xu, Fremont, CA (US); Nilesh Choudhury, Palo Alto, CA (US); Vinodh Kumar Kamattathil Ravindran, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 19/078,108

(22) Filed: Mar. 12, 2025

(51) Int. Cl.
*G06F 16/11* (2019.01)
*G06F 16/14* (2019.01)
*G06F 16/16* (2019.01)

(52) U.S. Cl.
CPC .......... *G06F 16/128* (2019.01); *G06F 16/148* (2019.01); *G06F 16/162* (2019.01)

(58) Field of Classification Search
CPC ..... G06F 16/128; G06F 16/148; G06F 16/162
USPC .......................................................... 707/649
See application file for complete search history.

(56) References Cited

U.S. PATENT DOCUMENTS

2016/0371078 A1* 12/2016 Holostov ............ G06F 9/44505
2018/0267985 A1* 9/2018 Badey ................... G06F 16/128
2019/0243543 A1* 8/2019 Mitkar ................ G06F 12/0871
2023/0027188 A1* 1/2023 Sridhar ............... H04L 67/1004
2024/0045766 A1* 2/2024 Hara .................. G06F 11/1456

* cited by examiner

*Primary Examiner* — Cam Y T Truong
(74) *Attorney, Agent, or Firm* — Hickman Becker Bingham Ledesma LLP; Stephen J. Walder, Jr.

(57) ABSTRACT

A computer program product, system, and computer implemented method for an approach to manage objects that tightly couple snapshots and clone management together. Specifically, the present disclosure provides for an approach where metadata for snapshots and clones of the extent can be managed using a single set of metadata that intermingles entries for any number of snapshots and clones together. This provides for a single place in which the storage system can access extent information for a given extent to determine what information corresponds to a request (e.g., create, read, update, delete requests). Additionally, the approaches provided herein further include support for variable sized allocation units and tombstones (that represent sparse data using metadata). In some embodiments, metadata and data referenced by corresponding metadata are stored on the same storage devices.

20 Claims, 17 Drawing Sheets

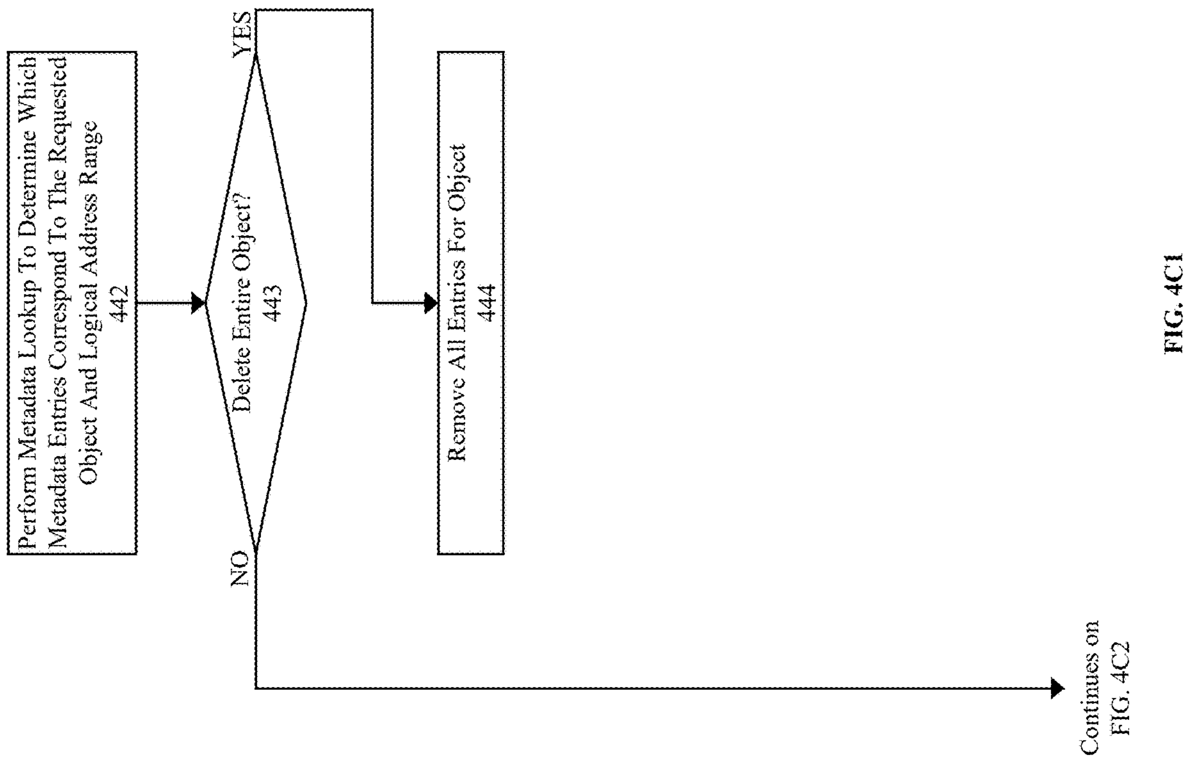
FIG. 4C1

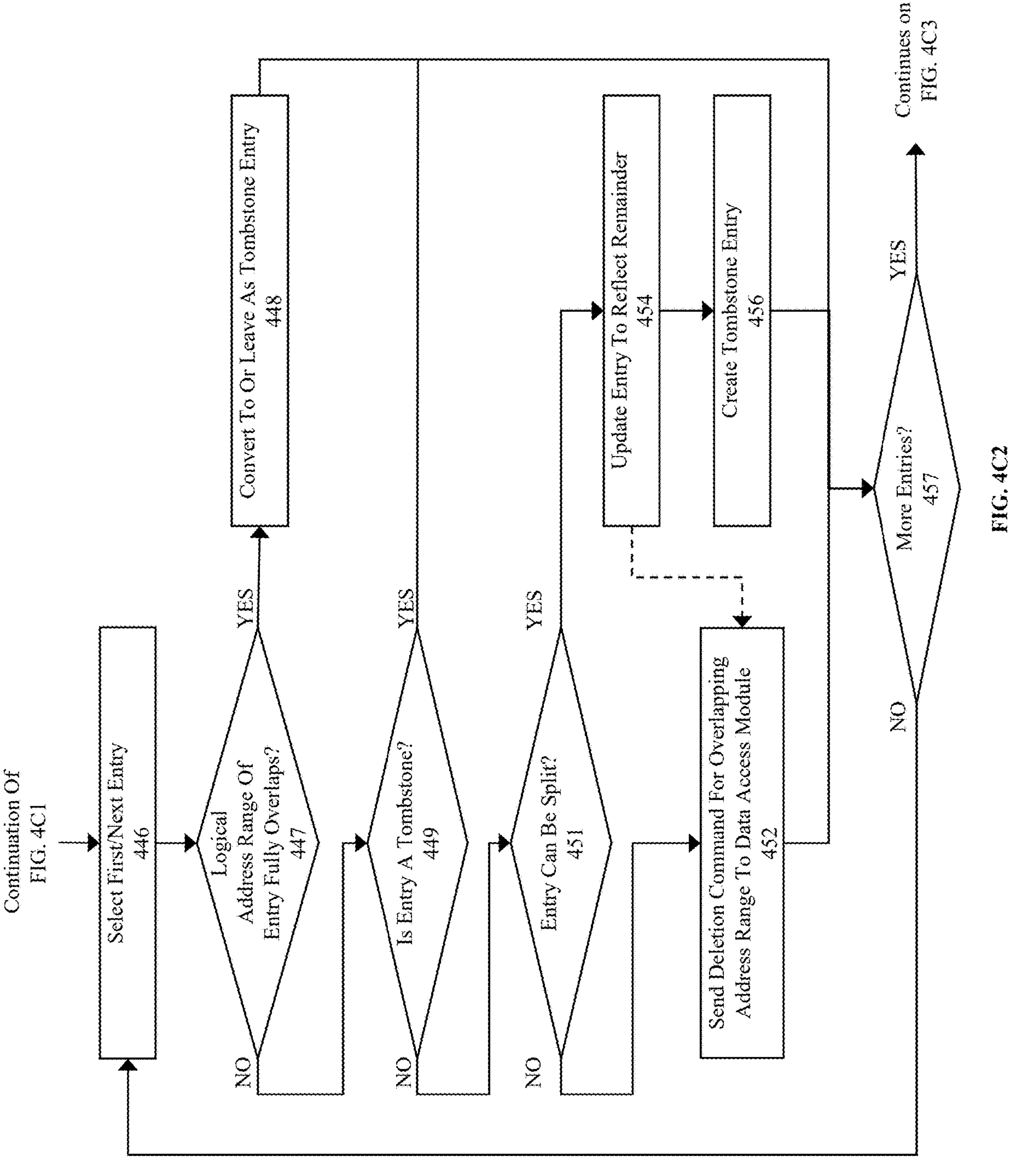
FIG. 4C2

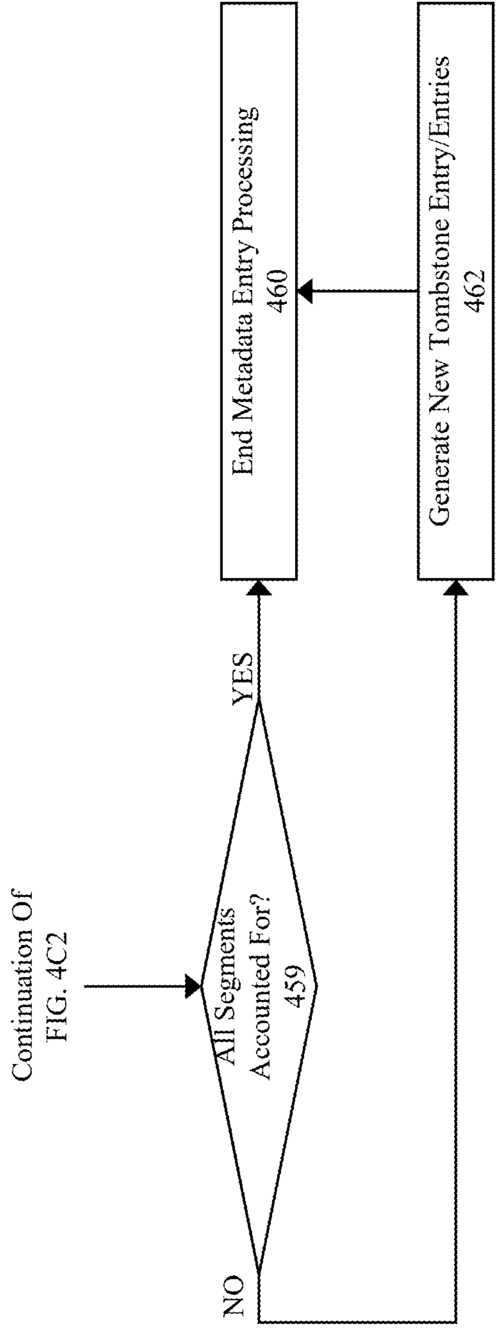
FIG. 4C3

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |
| s1 | Regular | 4 | 0 | PA-s11 |
| s2 | Tombstone | 4 | 2 | |
| s3 | Tombstone | 4 | 0 | |
| s4 | Regular | 2 | 2 | PA-s41 |

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |
| s1 | Regular | 4 | 0 | PA-s11 |
| s2 | Tombstone | 4 | 2 | |

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |
| s1 | Regular | 4 | 0 | PA-s11 |
| s2 | Tombstone | 4 | 2 | |
| s3 | Tombstone | 4 | 0 | |
| s4 | Regular | 2 | 2 | PA-s41 |

| Snapshot ID | Allocation Type | Allocation Size | Logical Offset | Physical Address |
| --- | --- | --- | --- | --- |
| s0 | Regular | 1 | 0 | PA-s01 |
| s0 | Regular | 2 | 2 | PA-s02 |
| s0 | Regular | 4 | 4 | PA-s03 |
| s1 | Regular | 4 | 0 | PA-s11 |
| s2 | Tombstone | 4 | 2 | |
| s3 | Tombstone | 4 | 0 | |
| s4 | Regular | 2 | 2 | PA-s41 |

| Snapshot ID | Allocation Type | Allocation Size | Logical Offset | Physical Address |
|---|---|---|---|---|
| s0 | Regular | 1 | 0 | PA-s01 |
| s0 | Regular | 2 | 2 | PA-s02 |
| s0 | Regular | 4 | 4 | PA-s03 |
| s1 | Regular | 4 | 0 | PA-s11 |
| s2 | Tombstone | 4 | 2 | |
| s3 | Tombstone | 4 | 0 | |
| s4 | Regular | 2 | 2 | PA-s41 |

DISTRIBUTED DATA STORE FOR EFFICIENT SNAPSHOT MANAGEMENT USING COLLOCATED METADATA

RELATED APPLICATION

The present application is related to co-pending U.S. patent application Ser. No. 19/077,858 titled "EFFICIENT ON DEMAND BLOCK GENERATION FOR SPARSENESS AWARE FILE SYSTEM", filed on even date herewith, which is hereby incorporated by reference in its entirety.

BACKGROUND

The rise of database systems and their usefulness for collecting, managing, and analyzing data has led to their prevalence in modern society. For example, various types of database systems (e.g., file, object, extent, block, and relational database systems) have been developed for tracking and managing data for untold numbers of organizations. However, as the use of the database systems have spread, so has the reliance on those databases for the activities of the entities that use them.

Commensurate with this rise is also an increase in the consumption of the underlying storage resources thereof. This is further complicated by data retention operations such as the creation of snapshots, which has a multiplicative effect on the amount storage required to service the storage of data. For example, without more, ten snapshots of a single file with each snapshot representing only a small change to the filed from a corresponding parent snapshot would utilize storage that is equal to roughly ten times the size of the file. This increase in storage consumption is particular notable in distributed storage systems where numerous customers are supported using a shared set of resources such a distributed data store. Given the vast amount of data to be stored, any improvements in the efficiency associated with storage of data can have significant impacts on storage consumption.

Therefore, there is a need for an improved efficiency in how distributed data stores manage snapshots.

SUMMARY

Embodiments of the present disclosure provide a method, apparatus, and product for a distributed data store for efficient snapshot management using collocated metadata.

The approaches disclosed herein are directed towards an approach to manage objects that tightly couple snapshots and clone management together. Specifically, the present disclosure provides for an approach where metadata for snapshots and clones of the extent can be managed using a single set of metadata that intermingles entries for any number of snapshots and clones together. This provides for a single place in which the storage system can access extent information for a given extent to determine what information corresponds to a request (e.g., create, read, update, delete requests). Additionally, the approaches provided herein further include support for variable sized allocation units and tombstones (that represent sparse data using metadata). In some embodiments, metadata and data referenced by corresponding metadata are stored on the same storage devices.

Further details of aspects, objects, and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. To better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

FIGS. 4A-4C3 illustrate approaches to entry processing to service storage node requests according to some embodiments.

DETAILED DESCRIPTION OF THE EMBODIMENTS OF THE DISCLOSURE

Figure 1:
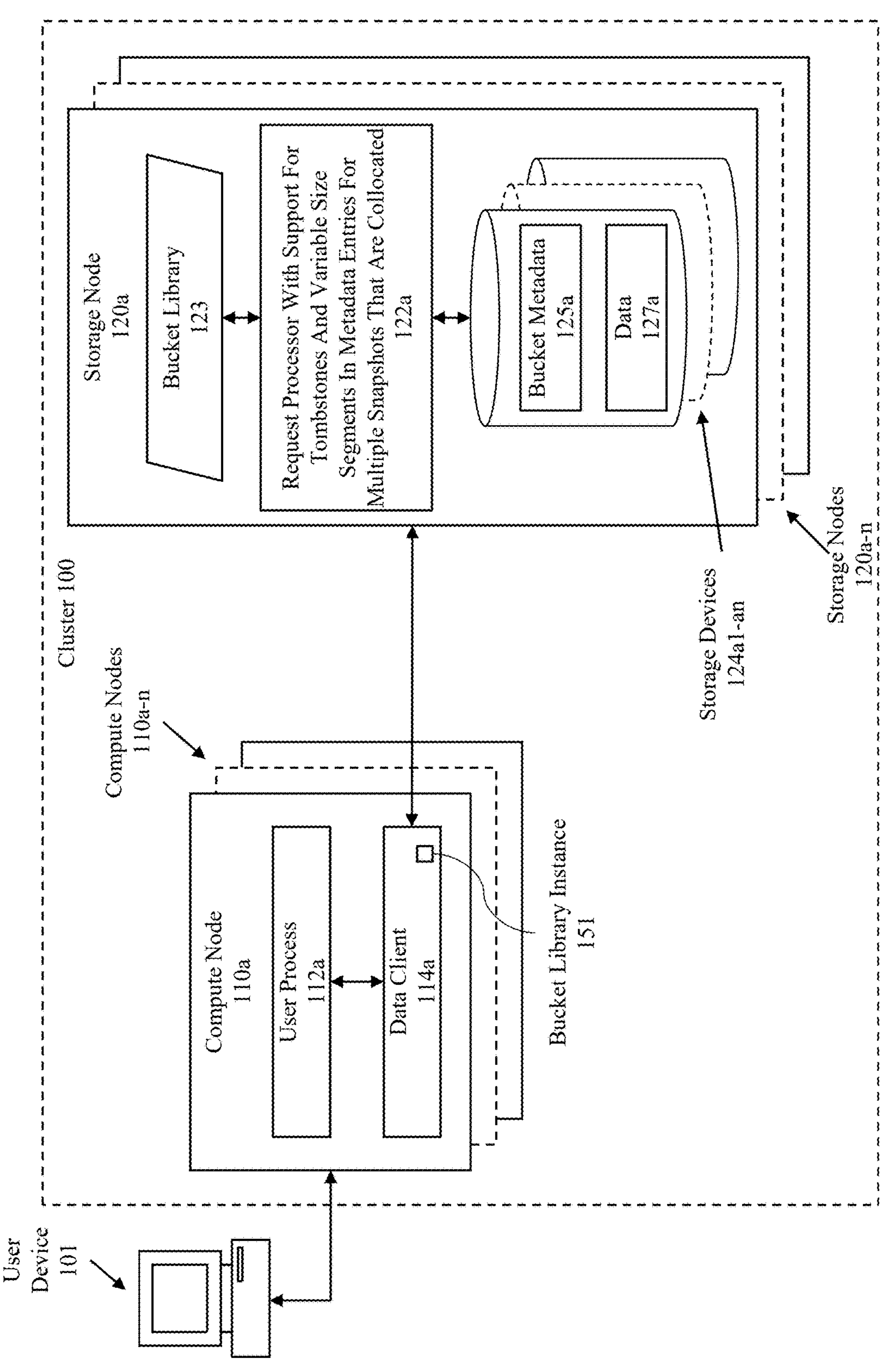
FIG. 1 illustrates an example system in which some embodiments of the disclosure may be implemented.

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Generally, the present embodiments are directed towards an approach to manage objects that tightly couples snapshots and cloning management together. Specifically, the present disclosure provides for an approach where metadata for snapshots and clones of the extent can be managed using a single set of metadata that intermingles entries for any number of snapshots and clones together. This provides for a single place in which the storage system can access extent information for a given extent to determine what information corresponds to a request (e.g., create, read, update, delete requests). As provided herein, an extent is a logical unit of storage space (storage unit). An extent may be constructed from a number of contiguous data blocks. The present disclosure discusses the approaches provided herein largely in the content on an extent. However, any appropriate contiguous storage unit could be used in place of an extent while still practicing the approaches disclosed herein.

Entries in a single set of metadata may be provided in any manner that is appropriate. For instance, each entry can identify a snapshot (read only copy of the extent) or clone (writable copy of the extent), a corresponding logical address range, a physical address range (when the entry references information on disk), and an entry type (e.g., regular or tombstone as will be discussed herein). Each entry may represent a whole or only a subset of the extent (e.g., if an extent is 1 MB then each entry may correspond to 8 KB, 16 KB 32 KB, 64 KB, 128 KB, 256 KB, 512 KB, or 1024 KB). In some embodiments, the size represented by each entry corresponds to a block size for underlying storage medium or a multiple thereof. In some embodiments, the largest possible contiguous allocation is selected to keep metadata to minimum. Additionally, a sparsity support feature is enabled by special entries called tombstones. Tombstones may be of any valid size (e.g., any of the variable sizes that are supported) but represent a logical absence of information or an initialization state. Such entries can be thought of as a hole in an extent where the information contained therein can be generated on the fly or comprises a static value or pattern fill (e.g., 0xBACACABA).

Using the above-described arrangement, the present approach can draw from a clone and any number of snapshots to determine the extent contents to be created, read, updated, or deleted. For example, a clone can comprise of copy of the extent from a parent snapshot with the exception of an updated 8 KB segment therein. Thus, a full extent read would return a copy of the parent snapshot with only the 8 KB segment replaced. Similarly, a clone can comprise of copy of the extent from a parent snapshot with the exception of an 64 KB segment therein that was replaced with a tombstone. Thus, a full extent read would return a copy of the parent snapshot with only the 64 KB segment replaced with a fill pattern or initialization values. In some embodiments, the tombstone may be represented logically in a response to a requestor to avoid transmitting the data generated by the fill pattern or initialization values (e.g., by identifying an offset, size, and pattern to be used). As provided herein any number of entries of different types can be provided as needed for efficient management of extents and snapshots and clones thereof. In some embodiments, the extent metadata and any data referenced are included within the same storage device. In some embodiments, the file comprises an image (e.g., ISO, VDI, VMDK, BHD, or HDD images) or database file (e.g., dbf, dbs, sql, or jdbc).

Benefits of the approaches included herein comprise at least space efficiency. The additional space required to store a snapshot can be just the difference that exists between the snapshot and the parent version. Any logical space associated with a file but not used can be stored in a such a way that physical space is not committed. Along the same lines, the space that is used for tracking updated data (e.g., metadata) on snapshots/clones can equal to just what has changed to avoid wasted space. For example, according to various embodiments, if the update to the snapshot/clone is data deletion, which is releasing data (e.g., a file trim operation), no additional space is used since deleting is a space releasing operation.

In some embodiments, the distributed data store disclosed herein is optimized for snapshots. This includes at least collocation of an extent and all its associated snapshot and clone data on the same physical device. This provides multiple benefits. For example, it establishes a restricted failure domain for the extent and all its snapshots and clones that is only dependent on the availability of a single physical device; it improves I/O efficiency by enabling all the metadata to be easily consulted up front to determine where each individual fragment of the I/O needs to be served from; it allows for sharing derived metadata like a storage index, caches (e.g., columnar cache) by associating derived objects and caches with a common parent node; and it improves data relocation efficiency since all allocations relating to extent and its snapshots and clones are located at the same place (e.g., the extent and its snapshots and clones can be moved together in a packed manner optimizing network usage). In some embodiments, the derived objects and caches can be relocated with the extent. In some embodiments, metadata for the extent is logically consolidated (defragmented) to reduce the memory footprint of the metadata. Another improvement is that for complex operations like differential reads between associated snapshots, the effort only involves traversing metadata for I/Os in a way that is restricted to only the involve snapshots.

some embodiments, data storage space is only allocated when a corresponding segment has been modified. As a result, file creation and file growth is instant (e.g., driven by the creation of metadata) since no space is materialized. Furthermore, a file initialization (such as one used for a database) can be converted into a metadata only operation since data that is unmodified can yield an expected pattern either encrypted (e.g., using an encryption key for the file) or unencrypted depending on the file property. By maintaining sufficient information to generate a desired pattern, storage materialization can be avoided. In fact, if all relevant file properties like encryption state (encrypted/unencrypted file status) and encryption keys are available to the storage on request, even encrypted files can benefit from the use of an expected pattern to generate desired blocks on demand for unmaterialized regions. This aspect is expanded to include dematerialization of allocated space on file trims, file shrink and re-initialization of data using pure metadata entries (e.g., tombstones as provided herein). In some embodiments, when sparse or partially sparse data is being read by client, sparse packing techniques are used to reduce network overhead in combination with client-side techniques to fill in (expand) the sparse information. In some embodiments, absence of any allocation corresponding to a logical address is treated as a read of an unmaterialized space (e.g., sparse read) and so always a predetermined pattern is returned as with a tombstone.

In some embodiments, metadata is organized into tree like hierarchy with every level associated with a logical entity. The first level of the tree is the bootstrap essential block zero which contains information about all extent groups. The second level is extent groups which carry metadata information about every extent that belongs to a corresponding extent group. The third level corresponds to extents which contains all common information about the corresponding extent and contains information about all allocations associated with the extent and all its snapshots and clones. There are multiple benefits to this approach. For example, deletion is very fast since all it pertains to is severing a link and then freeing the allocation in-memory. Metadata can be updated using atomic operations (e.g., when metadata updates are the size of a disk sector). Additionally, this can be leveraged to simplify failure handling by first performing any necessary any data write allocations, followed by a metadata update to link the new allocation to the metadata tree.

In some embodiments, the metadata tree describes every single allocation of the device and is used to build a free map on the fly after bootstrapping and keeping it updated thereafter. Such a free map can be generated by at least reading all the disk locations that have been allocated to some extent or its snapshots or clones in the metadata tree. This eliminates the need for a persistent free map.

Thus, the present approach provides for increase storage efficiency (e.g., by avoiding duplication of data and providing increased granularity for allocation of storage. The present approaches will be discussed in the context of a system such as that illustrated in FIG. 1 and elsewhere herein.

FIG. 1 illustrates an example system in which some embodiments of the disclosure may be implemented. Generally, the example system includes a cluster having a number of nodes (e.g., storage nodes and compute nodes) that perform compute and storage functions on behalf of one or more users that access the cluster using one or more user devices.

As illustrated, a cluster 100 includes a plurality of storage nodes (see 120*a-n*) and a plurality of compute nodes (see 110*a-n*). As provided herein, the storage nodes (see 120*a-n*) together form a distributed data store that is accessible using a data client which may be located on a compute node (see e.g., 114*a*). Additionally, the cluster is accessible via user devices (see e.g., user device 101) through the compute nodes.

As an initial matter, a user device (e.g., 101 interacts with data storage (see e.g., 127*a* on storage devices 124*a*1-an) via a compute node (e.g., 110*a*) using one or more sessions. The user device 101 comprises any type of computing device that may be used to operate or interface with the storage node(s), whether directly or indirectly. Examples of such a computing device include workstations, personal computers, laptop computers, or remote computing terminals. Computing devices may also comprise any type of portable tablet device, including for example, tablet computers, and portable readers. Computing devices may also include any mobile device that can suitably access any computing systems on the Internet such as smartphones and mobile handsets. It is noted that this disclosure is not limited in its application to just these types of devices. The embodiments of the disclosure are applicable to any computing device that works in conjunction with access to digital information stored on, as an example, the Internet. One of ordinary skill in the art may appreciate that embodiments of this present disclosure may be implemented on the Internet, on a closed network, on a hybrid open and closed network, or on a cloud network.

Furthermore, the user device can be controlled by a user, another service, an administrator, or comprise any other user device that allows for access or management of data. Additionally, a distribute data store may be associated with any number of users via one or more compute nodes that are each in turn associated with one or more user devices such as user device 101. In some embodiments, a compute node or user device may be combined together.

As provided herein, compute nodes (see e.g., 110*a-n*) execute one or more user processes (see e.g., 112*a*). Generally, such processes are executed on a session-by-session basis, where a user may start a session with a compute node and control the execution of one or more workflows or processes. As part of the performance of those workflows or processes, the user process may generate requests to perform file operations. For example, the user process may cause requests such as filed creation, file initialization, file open, file read, file write, or file delete (e.g., trim) operations. Such request would be forwarded to a corresponding data client on the node (e.g., 114*a*) to perform the requested operation.

In some embodiments, the data client interacts with a file manager (not illustrated) to retrieve relevant file metadata for determining which node(s) would be used for storing data for a corresponding file. For example, a database ID, a block size, and a file type, can be used by the data client to perform a corresponding lookup against a set of information for determining where file contents can be located. For instance, the data client can include a bucket library instance (e.g., 151) that can be used to determine which buckets may contain or be used to contain the file contents—e.g., by calculating an offset of the file and using that offset to lookup the corresponding bucket(s). Subsequently, a hashing algorithm can be used to determine which disks have the corresponding bucket(s). Based on this information the data client (e.g., 114*a*) generates one or more storage node requests that are transmitted to the corresponding storage node(s). In some embodiments, the data client sends storage node requests to multiple storage nodes of the distributed data store. In some embodiment, the data client receives responses from multiple storage nodes of the distributed datastore and aggregates those response to form a response to the file request—e.g., where different portions of the request correspond to different extents in different buckets on different storage nodes.

When a storage node request is received at a storage node it is routed to a request processor therein (see e.g., 122*a*). As provided herein, the request processor supports both tombstones and variable size segments. The support for multiple entries for each extent where those entries may be of different sized and may represent different segments of the extent provides for an efficient manner to represent an extent snapshot or clone thereof. Each storage node request will correspond to at least one object (e.g., an extent).

For instance, many files change over time. Upon creation of a file a set of metadata can merely specify the existence of a file. Such an entry can be represented solely in a file manager. Before a first use, the file would be initialized (e.g., by creating a header, adding fill to the body, and a footer indicating the end of the file). If this file is represented in one or more extents, the header and footer can be efficiently represented using entries of a smallest available size (e.g., 8 KB) that is backed by a physical storage device. The remainder of the file can be represented using a tombstone that describes the size of the body and is associated with a fill pattern but is not backed by a physical storage device. Such fill can comprise any appropriate generatable information such as a pattern or a static value. Using this approach, an extent would only consume two 8 KB sized storage region (e.g., blocks) on a physical disk with the remainder being saved (e.g., if the extent is 1 MB then the saved physical storage space is 1024 KB−2*8 KB=1008 KB). As data is written to the extent storage from the backing storage device is allocated for storage of that information and entries are generated in the metadata for the extent. Snapshots can be taken at any time (essentially by merely changing a current clone/snapshot ID), and requests can be processed using information from any number of entries as appropriate (e.g., the clone of an extent can comprise information from one or more parent snapshots and from the clone itself). Additional details will be discussed further herein.

Upon receipt of such a request, each storage node will determine how to process the user request by accessing one or more of a bucket library (see e.g., 123) or bucket metadata (see 125*a*). Generally, the bucket library is the same as the bucket library instance. However, the bucket library instance on the compute node will only include the information that is relevant to the particular compute node. For instance, a subset of the bucket library that is relevant to users that are associated with a current session with the compute node. In contrast one or more storage nodes will include a larger portion of the bucket library.

The request processor 122*a*, processes the corresponding bucket metadata (see 125*a*) which comprises at least the discussed entries and may further comprise relationship information that enables the request processor to determine interrelationships between clones and snapshots, and between snapshots and snapshots. This information can be used to determine the content of a logical address range that corresponds to an access request to an extent (whether the whole or only part of the extent) as will be discussed herein.

In some embodiments, the metadata for an extent (see e.g., bucket metadata 125*a*) and the data that the extent references may be located on the same physical storage device (see e.g., data 127*a*). As provided herein, each storage node may include any number of storage devices (see e.g., 124*a*1-an) which may be of any appropriate type (e.g., HDD or SSD). Entries within the bucket metadata can then reference physical storage location on the same storage device that contain the relevant data.

Figure 2:
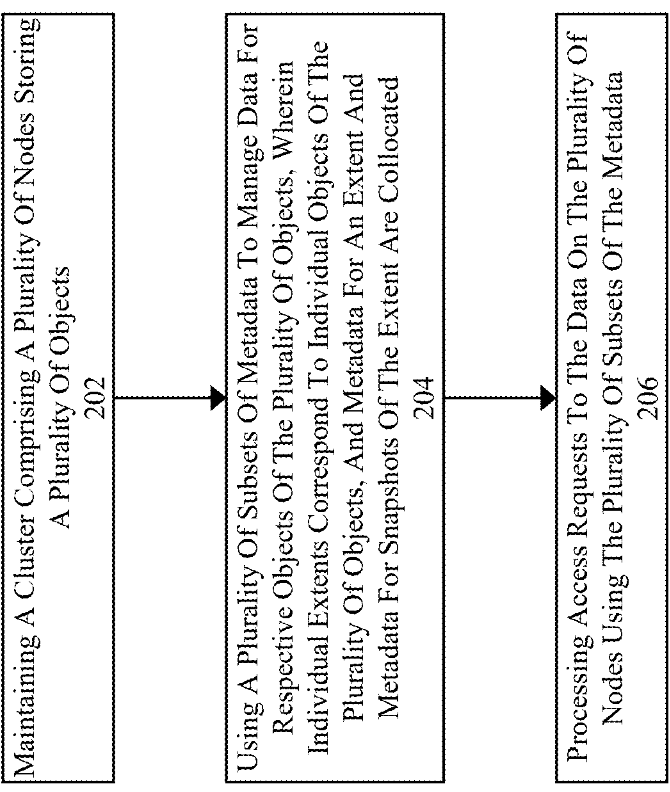
FIG. 2 illustrates a flow for using efficient database snapshots in a distributed data store according to some embodiments.

FIG. 2 illustrates a flow for using efficient database snapshots in a distributed data store according to some embodiments. Generally, the approach comprises maintaining a cluster comprising nodes that store a plurality of objects, using a plurality of subsets of metadata to manage data for respective objects of the plurality of objects, and processing access requests to the data on the plurality of storage nodes using the plurality of subsets of the metadata.

At 202, a cluster comprising a plurality of nodes stores a plurality of objects. For example, each node of a plurality of nodes stores a collection of extents. Each collection of extents is managed using a given bucket (metadata bucket) and corresponds to a file. Each bucket can be used to perform a lookup operation to determine the content(s) or locations of content of the extent that are relevant to a received request.

Specifically, at 204 a plurality of subsets of metadata can be used to manage data for respective objects of the plurality of objects. Additionally, each subset of the plurality of subsets corresponds to an extent, and individual extents correspond to individual objects of the plurality of objects. Snapshots of the objects and their extents may be taken at any time, and the metadata for those snapshots can be maintained within the same subset. As will be discussed further herein, the metadata within a subset can be used to determine the relevant portion(s) of data necessary to service a request regardless of whether those portions are determined using information from a single snapshot or multiple snapshots. Additionally, further optimizations are provided herein such as the use of tombstones to indicate holes and variable size segments for maintaining information to represent portions of the extent.

At 206, the plurality of subsets of metadata are used to provide for processing of access requests to the plurality of storage nodes. Such processing generally comprises using an identifier (e.g., snapshot identifier) to determine relevant entries and constructing a response based on those entries. Further details are provided herein.

Figure 3:
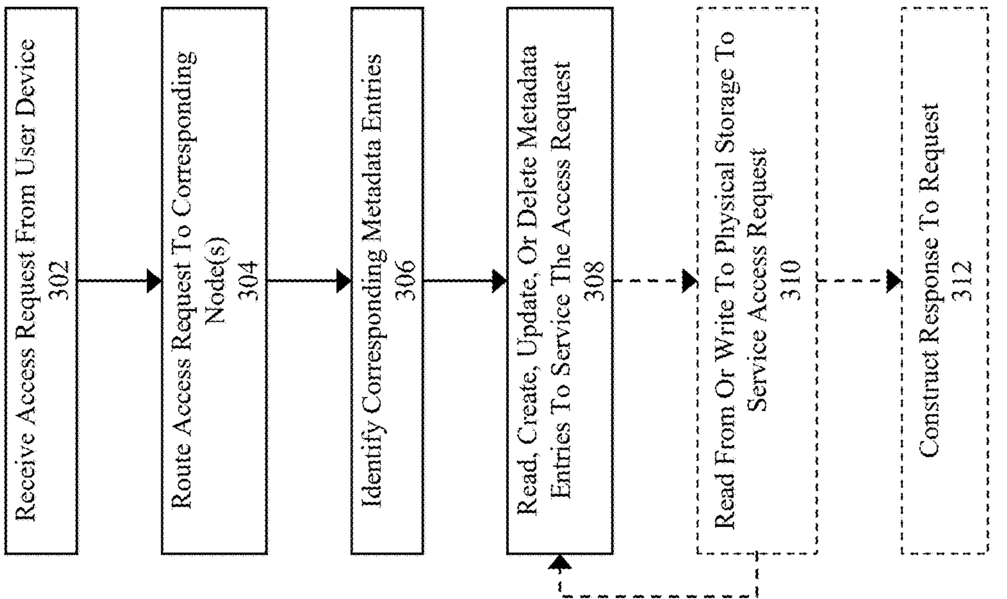
FIG. 3 illustrates a flow for processing request to the distributed data store according to some embodiments.

FIG. 3 illustrates a flow for processing a request to the distributed data store according to some embodiments. Generally, the approach comprises receiving an access request from a user device, routing the access request to the corresponding nodes, identifying the corresponding metadata entries, performing the requested operation. Some embodiments also include reading from or writing to physical storage and constructing a response to a request.

Generally, a request is received from a user device (see e.g., 302). For instance, a user device that is connected to a compute node using a currently active session can send a request to access to a file. That access request is routed to the corresponding node(s) at 304. For example, a data client performs a lookup on a bucket library instance to determine which storage device(s) include or may include the requested data and forwards a corresponding request(s) (storage node request(s)) to the storage nodes having the identified storage device(s) based on at least the bucket library instance information (see e.g., 151).

Generally, a request is received from a user device (see e.g., 302). For instance, a user device that is connected to a compute node using a currently active session can send a request to access to a file. That access request is routed to the corresponding node(s) at 304. For example, a data client performs a lookup on a bucket library instance to determine which storage device(s) include or may include the requested data and forwards a corresponding request(s) (storage node request(s)) to the storage nodes having the identified storage device(s) based on at least the bucket library instance information (see e.g., 151).

Upon receipt of a storage node request at a storage node a subset of metadata is processed to identify metadata entries therein that are relevant to the request at 306. For example, extent identification information can be used to determine which subset of the plurality of subsets of metadata are potentially relevant to the request. Generally, this comprises all entries for an extent that overlap with an address range identified in the storage node request. Those entries are then read (e.g., to service a read request), updated (e.g., to service a write request), or deleted (e.g., to service a write or delete request) to service the access request at 308. In some embodiments, one or more new entries are created to store additional information about the extent (e.g., tombstone entries, regular entries, or a combination thereof).

At 310, the corresponding storage device is read from or written to as indicated by the access request. For, example, a read can require accessing one or more blocks on a storage device to retrieve data or to write data. In some embodiments, the ordering of operations is dependent on the operation being performed. For example, when storage node request that requires that data be written to a storage device, that data is first written before changing or creating a corresponding entry in metadata. Such techniques serve to avoid data corruption in the event that the request fails during processing.

Finally, at 312 a response is constructed to the storage node request. For instance, a buffer can be populated with the retrieved data segments properly ordered therein. The response can further comprise constructing a response header and providing a specification therein of one or more segments that correspond to a tombstone (e.g., pattern fill, static fill, etc.). Such an approach can be used to avoid transmitting data that can otherwise be easily generatable using the data client that sent the storage node request.

Figure 4A:
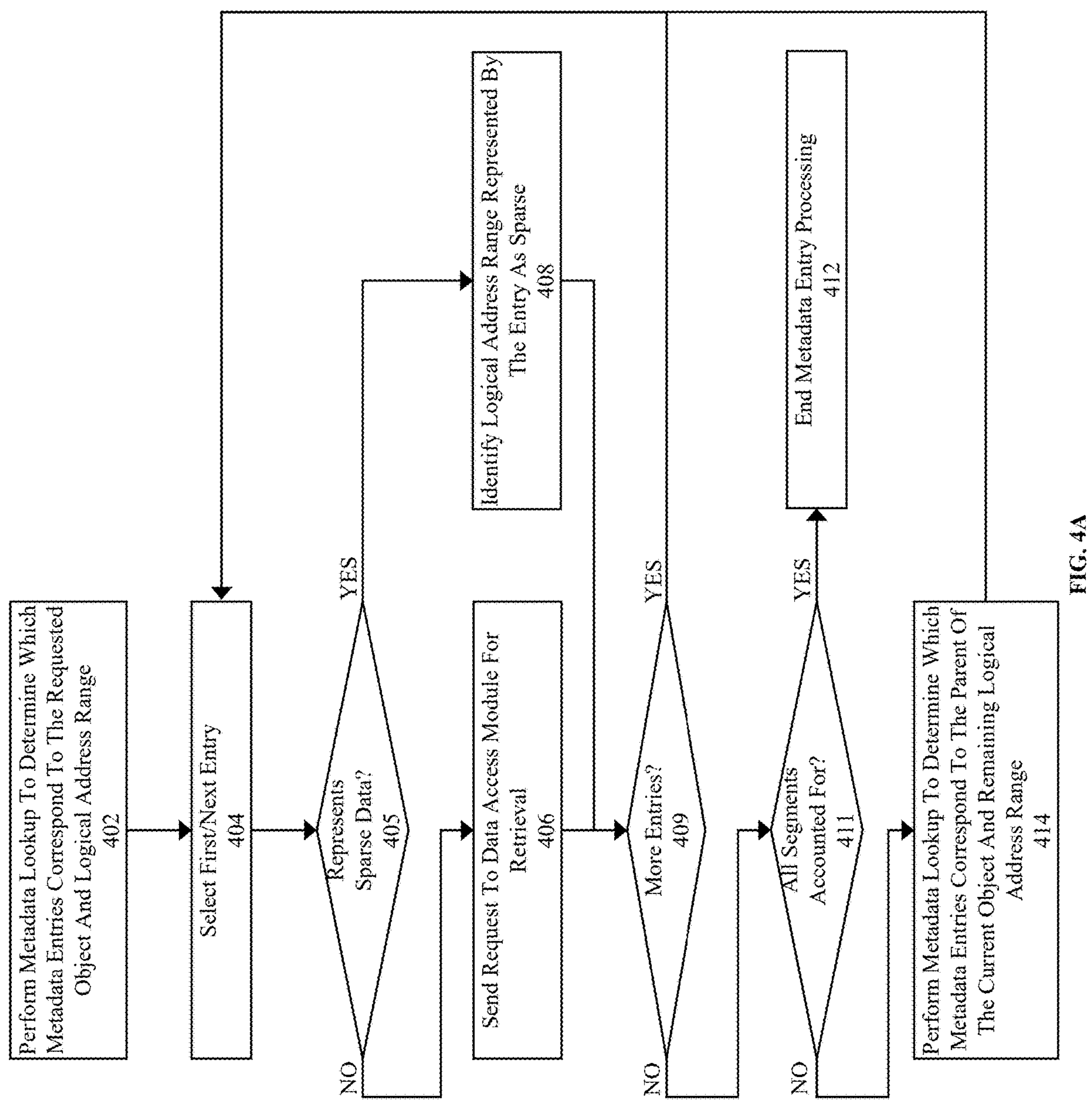

FIGS. 4A-4C3 illustrate approaches to entry processing to service storage node requests according to some embodiments.

FIG. 4A illustrates a flow for processing a storage node request specifying a read operation at a storage node according to some embodiments. Generally, the approach processes the entries in a hierarchical manner where entries for the requested object (which may be a clone or a snapshot) are processed first, followed by processing of entries for an immediate parent and then the parent's parent and so on until all segments needed to service the storage node request are collected.

In some embodiments, the process starts at 402 where a metadata lookup is performed to determine which metadata entries correspond to a requested object and logical address range for the request. For example, a snapshot ID (e.g., for a snapshot or clone that represents the requested object) and a logical address range can be used to perform a lookup to identify all entries that are relevant to the request—e.g., include the snapshot ID and overlap with the logical address range. Those entries are subsequently selected one-by-one for processing at 404.

Specifically, at 404 a first or next entry in selected for processing. To process the selected entry, the flow first determines whether the entry corresponds to sparse data at 405. For example, the entry can be identified as sparse based on a value in a type field (e.g., as sparsity identifier or tombstone entry type) or based on a lack of a valid physical address (e.g., 0). If the entry is of a type that is sparse (e.g., a tombstone), then the process proceeds to 408 where the logical address range specified by the entry is identified as sparse. On the other hand, if the entry is not sparse, a request is forwarded to a data access module (e.g., to a device controller) to retrieve the identified data at the corresponding physical address contained in the entry at 406. After which, if there are more entries to be processed (see e.g., the determination at 409) the process returns to 404 to select the next entry for processing. If on the other hand, it is determined (see e.g., the determination at 409) that all the corresponding entries for the object have been processed the flow proceeds to 411.

At 411 a determination is made as to whether all segments have been accounted for. Specifically, the approach can determine whether the entries that have been processed thus far describe the contents of the entire logical address range for the request. Any number of approaches could be taken to enable such a determination. For instance, a vector-based approach could be utilized. For example, a request vector and processing vector of the same size could be generated for each request. The request vector and the processing vector each include a number of bits that is equal to the largest number of segments that could be used to represent that object. For instance, if the object is an extent of 1 MB and the smallest size corresponding to each entry is 8 KB then the vectors would each be 128 bits long. Each bit that corresponds to a segment that is encompassed by the request is set (e.g., to 1) in the request vector to indicated that it is requested and the remainder are clear (e.g., set to 0). Similarly, after initially clearing all the bits of the processing vector, each entry is processed and the corresponding bits are set. Upon reaching 411, the request vector and the processing vector are compared to determine whether all segments have been accounted for. If all segments have been accounted for, the process proceeds to 412 where metadata entry processing ends. However, if the request vector is not equal to the processing vector, a metadata lookup is performed to determine which metadata entries corresponding to a current object and logical address range for the request at 414. This is essentially the same as with 402 but is only for the remaining logical address range. Additionally, this process will continue until all segments have been accounted for as determined at 411.

Figure 4B:
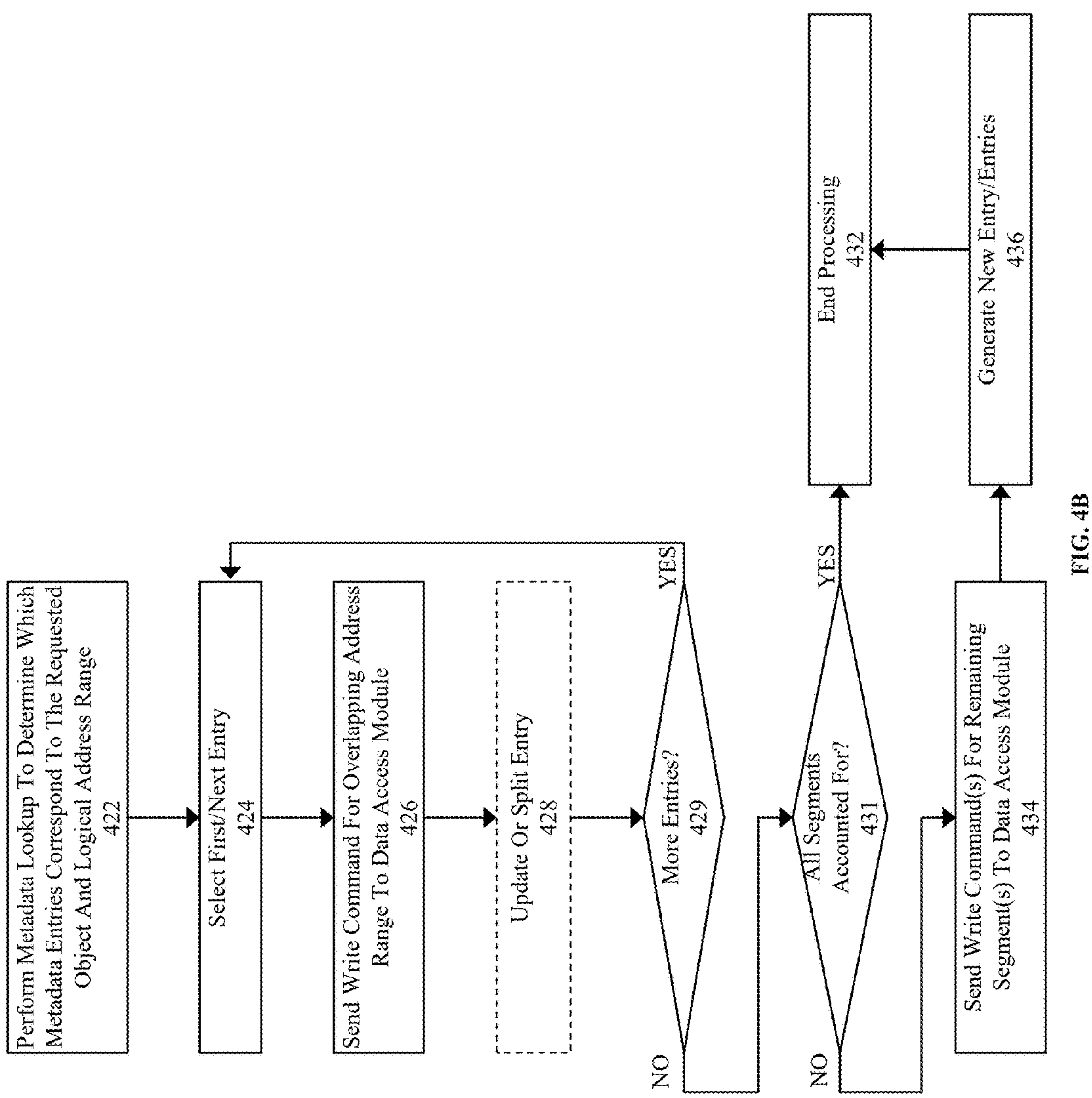

FIG. 4B illustrates a flow for processing a storage node request specifying a write operation at a storage node according to some embodiments. Generally, the approach is implemented in what can be thought of as two phases. In a first phase, data is written for overlapping address ranges for any existing entries. In a second phase, any remaining segments are written to disk and corresponding entries are generated for future reference to those segments.

In some embodiments, the process starts at 422 where a metadata lookup is performed to determine which metadata entries correspond to a requested object and logical address range for the request. For example, a snapshot ID (e.g., for a snapshot or clone that represents the requested object) and a logical address range can be used to perform a lookup to identify all entries that are relevant to the request—e.g., include the snapshot ID and overlap with the logical address range. Those entries are subsequently selected one-by-one for processing at 424.

Specifically, at 424 a first or next entry is selected for processes. To process the selected entry, a write command is sent to the data access module to update the corresponding physical address range identified in the entry at 426. In some embodiments, the address range of the entry and the address range to be written may fully overlap. However, in some embodiments, only a subset of the address range of the entry and the address range overlap and offsets or addresses are used to update only the overlapping portion thereof. In some embodiments, the entry comprises a tombstone. Such entries may require special handling. For instance, at 428 the tombstone entry is updated or split. As provided herein, an update converts the tombstone entry into a regular entry and adds a corresponding physical address where the data is stored. However, if the tombstone and the address range to be written do not fully overlap, in some embodiments, the tombstone entry is updated to include only the remainder that is to remain a tombstone and an additional entry is added to represent the data that was written. Still further, in some embodiments, when the tombstone and the address range to be written do not fully overlap, the write operation may also write fill for a subset of the tombstone entry. In some embodiments, the tombstone entry is split and the write operation writes one or more segments with fill. After which, if there are more entries to be processed (see e.g., the determination at 429) the process returns to 404 to select the next entry for processing. If on the other hand, it is determined (see e.g., the determination at 429) that all the corresponding entries for the object have been processed the flow proceeds to 431.

At 431 a determination is made as to whether all segments have been accounted for. Specifically, the approach can determine whether the entries that have been processed thus far describe the contents of the entire logical address range for the request. Any number of approaches could be taken to enable such a determination. For instance, a vector-based approach could be utilized. For example, a request vector and processing vector of the same size could be generated for each request. The request vector and the processing vector each include a number of bits that is equal to the largest number of segments that could be used to represent that object. For instance, if the object is an extent of 1 MB and the smallest size corresponding to each entry is 8 KB then the vectors would each be 128 bits long. Each bit that corresponds to a segment that is encompassed by the request is set (e.g., to 1) to indicated that it is requested and the remainder are clear (e.g., set to 0). Similarly, after initially clearing all the bits of the processing vector, each entry is processed and the corresponding bits are set. Upon reaching 431, the request vector and the processing vector are compared to determine whether all segments have been accounted for. If all segments have been accounted for, the process proceeds to 432 where processing ends. However, if the request vector is not equal to the processing vector, one or more write commands are sent for the remaining segment(s) to the data access module at 434 and one or more new entries are generated at 436 before ending the process at 432, which may include fill generation and encryption as discussed elsewhere herein.

FIGS. 4C1-4C3 illustrate a flow for processing a storage node request specifying a delete operation at a storage node according to some embodiments. Generally, the approach includes one or more of deleting entries, updating entries, creating entries, and splitting entries.

In some embodiments, the process starts at 442 where a metadata lookup is performed to determine which metadata entries correspond to a requested object and logical address range for the request. For example, a snapshot ID (e.g., for a clone that represents the requested object) and a logical address range can be used to perform a lookup to identify all entries that are relevant to the request—e.g., include the snapshot ID and overlap with the logical address range.

At 443, it is determined whether the storage node request is to delete the entire object. If the request is to delete the entire object the process proceeds to 444 where all metadata entries are removed for the object. If on the other hand the request is to delete only a part of the object the process proceeds to 446.

Specifically, at 446 a first or next entry is selected for processing. To process the request a series of comparisons may be performed. For example, if the logical address range of the entry fully overlaps with the logical address range to be deleted (see 447) the process proceeds to 448 where the entry is converted to, or left as, a tombstone entry. However, if the logical address range of the entry does not fully overlap with the logical address range to be deleted (see 447), the process proceeds to 449 where it is determined whether the entry is a tombstone. If the logical address range of the entry does not fully overlap with the logical address range to be deleted (see 447) and the entry is not a tombstone (see 449), the process proceeds to 451 where it is determined whether the entry can be split. As provided herein, splitting an entry is possible when a tombstone can be formed for a first portion and a regular entry can be formed for a second portion. Generally, splitting is possible when a both the portion to be deleted can be represented by a tombstone with a valid size and a remainder can be formed with a valid size. In some embodiments, multiple remainders may be formed. For instance, an entry that represents four segments can be split into three entries, a first that represents a single segment and is a tombstone, a second that represents another single segment and is a first remainder, and a third that represents two segments and is a second remainder.

If it is determined that the entry cannot be split, the process proceeds to 452 where a deletion command is sent to the corresponding data access module for the overlapping address range. Such a command can specify writing a corresponding portion of fill to the underlying physical storage device. On the other hand, if the entry can be split (see 451) then the process proceeds to 454 where the entry is updated to reflect the remainder and to 456 where a tombstone entry is created for the deleted address range. Additionally, in some embodiments, after an entry is updated to reflect a remainder (see 454) the process may also process to 452 to specify writing a corresponding portion of fill to the underlying physical storage device. After which, if there are more entries to be processed (see e.g., the determination at 457) the process returns to 446 to select the next entry for processing. If on the other hand, it is determined (see e.g., at 457) that all the corresponding entries for the object have been processed the flow proceeds to 459.

At 459 a determination is made as to whether all segments have been accounted for. Specifically, the approach can determine whether the entries that have been processed thus far describe all the deleted contents of the entire logical address range for the request. Any number of approaches could be taken to enable such a determination. For instance, a vector-based approach could be utilized. For example, a request vector and processing vector of the same size could be generated for each request. The request vector and the processing vector each include a number of bits that is equal to the largest number of segments that could be used to represent that object. For instance, if the object is an extent of 1 MB and the smallest size corresponding to each entry is 8 KB then the vectors would each be 128 bits long. Each bit in the request vector that corresponds to a segment that is encompassed by the request is set (e.g., to 1) to indicated that it is requested and the remainder are clear (e.g., set to 0). Similarly, after initially clearing all the bits of the processing vector, each entry is processed and the corresponding bits are set. Upon reaching 459, the request vector and the processing vector are compared to determine whether all segments have been accounted for. If all segments have been accounted for, the process proceeds to 460 where processing ends. However, if the request vector is not equal to the processing vector, one or more new tombstone entries are generated at 462 before ending the process at 460.

Figure 5:
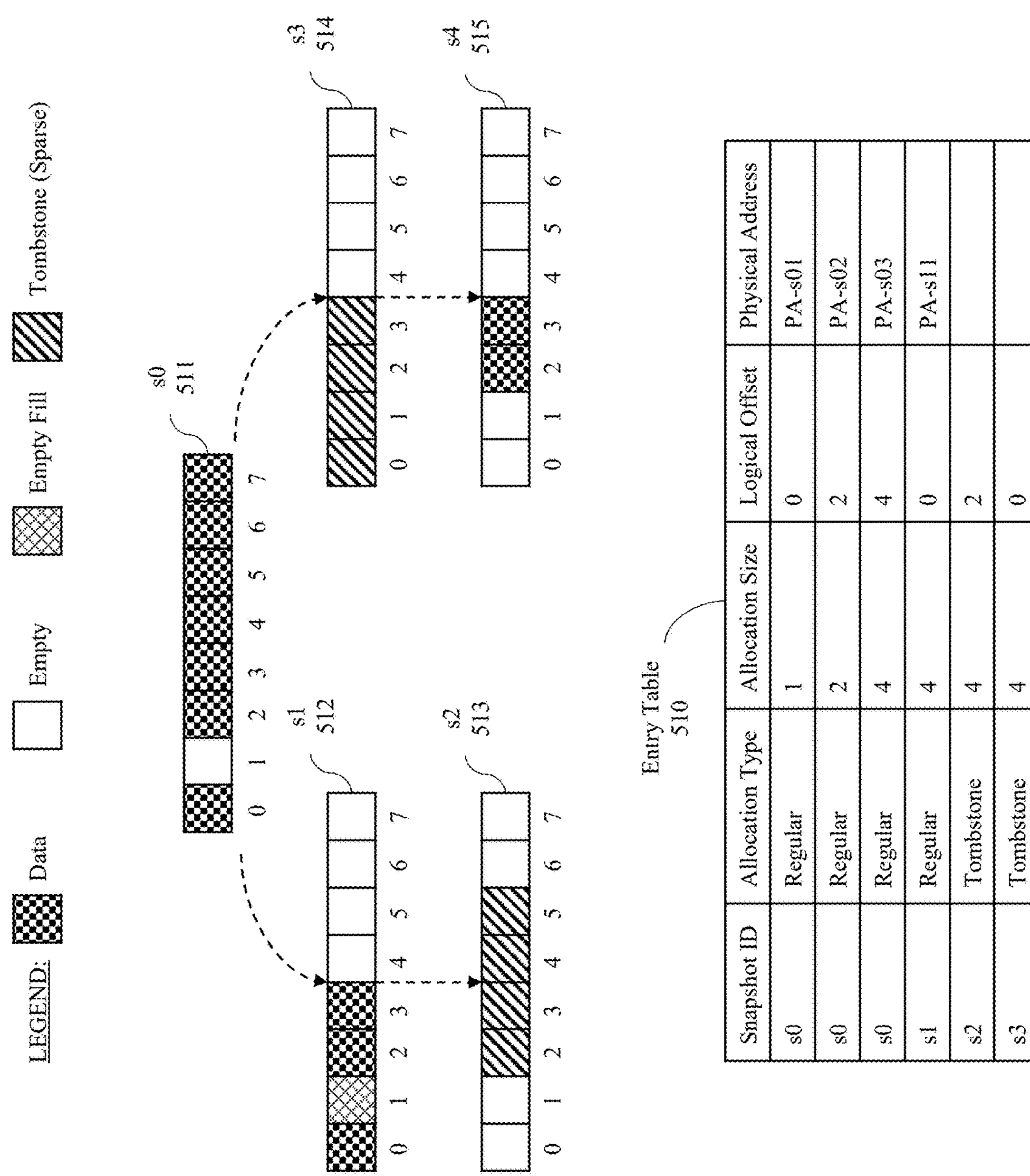
FIG. 5 provides an illustrative example of a set of entries for an object and a visual representation thereof according to some embodiments.

FIG. 5 provides an illustrative example of a set of entries for an object and a visual representation thereof according to some embodiments.

An entry table having a plurality of rows and columns is illustrated at 510. The columns are organized left to right as snapshot ID, allocation type, allocation size, logical offset, and physical address. Each row represents an entry that uses a snapshot ID as a key. As provided herein snapshots and clones are all identified using a snapshot ID. The difference between a snapshot and a clone being that the clone does not currently having any child snapshots or clones and is writable. Whereas a snapshot is read-only. However, by identifying snapshots and clones by a snapshot ID, the computing system can consistently and efficiently identify a corresponding requested object. Each entry also includes an allocation type specification (e.g., regular or tombstone). A regular allocation type is just that, an entry that represents an allocation of storage where data has been stored for the corresponding object. A tombstone on the other hand does not require a corresponding allocation of storage as it instead identifies a segment that is sparse or to be populated with a known static or fill value. An allocation size specifies the number of segments that the entry represents. Allocation sizes may conform to a set of valid sizes. For example, a smallest allocation size may comprise 1 segment, with each subsequent allocation size being twice as large as the prior allocation size (e.g., 1, 2, 4, 8, 16, etc.) up to an allocation size that is equal to the size of the object (extent) to which they correspond. In some embodiments a segment size comprises a block size for an underlying storage device upon which corresponding data would be stored. A logical offset is a number of segments from the start of the object (e.g., extent) to which the information corresponds. Finally, where appropriate a physical address is provided that specifies a starting location where corresponding data can be found (see e.g., PA-s01, PA-s02, PA-s03, PA-s11, PA-s41,). In some embodiments, tombstone entries are not associated with a corresponding physical address. In some embodiments, a tombstone entry may include a physical address but that address is ignored.

The visual representation of the extent at the time that snapshot s0 was taken is represented at 511. As can be seen from the representation, all segments (0-7) are associated with stored data with the exception of segment 1. The first segment corresponds to the entry table row with the snapshot ID of s0, the logical offset of 0, and an allocation size of 1. The second and thirds segments corresponds to the entry table row with the snapshot ID of s0, the logical offset of 2, and an allocation size of 1. The fourth through seventh segments corresponds to the entry table row with the snapshot ID of s0, the logical offset of 4, and an allocation size of 4.

The visual representation of the extent at the time that snapshot s1 was taken is represented at 512. In the present example, snapshot s1 is a child of snapshot s0. As can be seen from the representation segments (0-3) are associated with stored data. However, segment 1 is actually populated with empty fill (e.g., a pattern or static value as discussed herein). This is because S1 corresponds to a single entry in the entry table (see 510) having an allocation size of 4 and an offset of zero. As a result, prior to creation of that entry, empty fill was written into the segment 1 while the remainder of the data was written into segments 0, 2, and 3.

The visual representation of the extent at the time that snapshot s2 was taken is represented at 513. In the present example, snapshot s2 is a child of snapshot s1. As can be seen from the representation segments (2-5) are associated with stored data. This corresponds to the single entry in the entry table (see 510) having an allocation size of 4 and an offset of 2.

The visual representation of the extent at the time that snapshot s3 was taken is represented at 514. In the present example, snapshot s3 is a child of snapshot s0. As can be seen from the representation segments (0-3) are associated with a tombstone. This corresponds to the single entry in the entry table (see 510) having an allocation size of 4 and an offset of 0. Such an entry essentially indicates to the storage node that s3 is essentially s0 with segments 0-3 removed.

The visual representation of the extent at the time that snapshot s4 was taken is represented at 515. In the present example, snapshot s4 is a child of snapshot s2. As can be seen from the representation segments (2-3) are associated with stored data. This corresponds to the single entry in the entry table (see 510) having an allocation size of 4 and an offset of 2. Such an entry essentially indicates to the storage node that s4 is essentially s3 with segments 2-3 added.

FIGS. 6A-6D provide an illustrative example of how a set of entries are generated, and a visual representation thereof, for an object illustrated in FIG. 5 according to some embodiments. The description of like identified elements discussed in regard to FIG. 5 are applicable to the present embodiment discussed in FIG. 6A-6D.

Figure 6A:
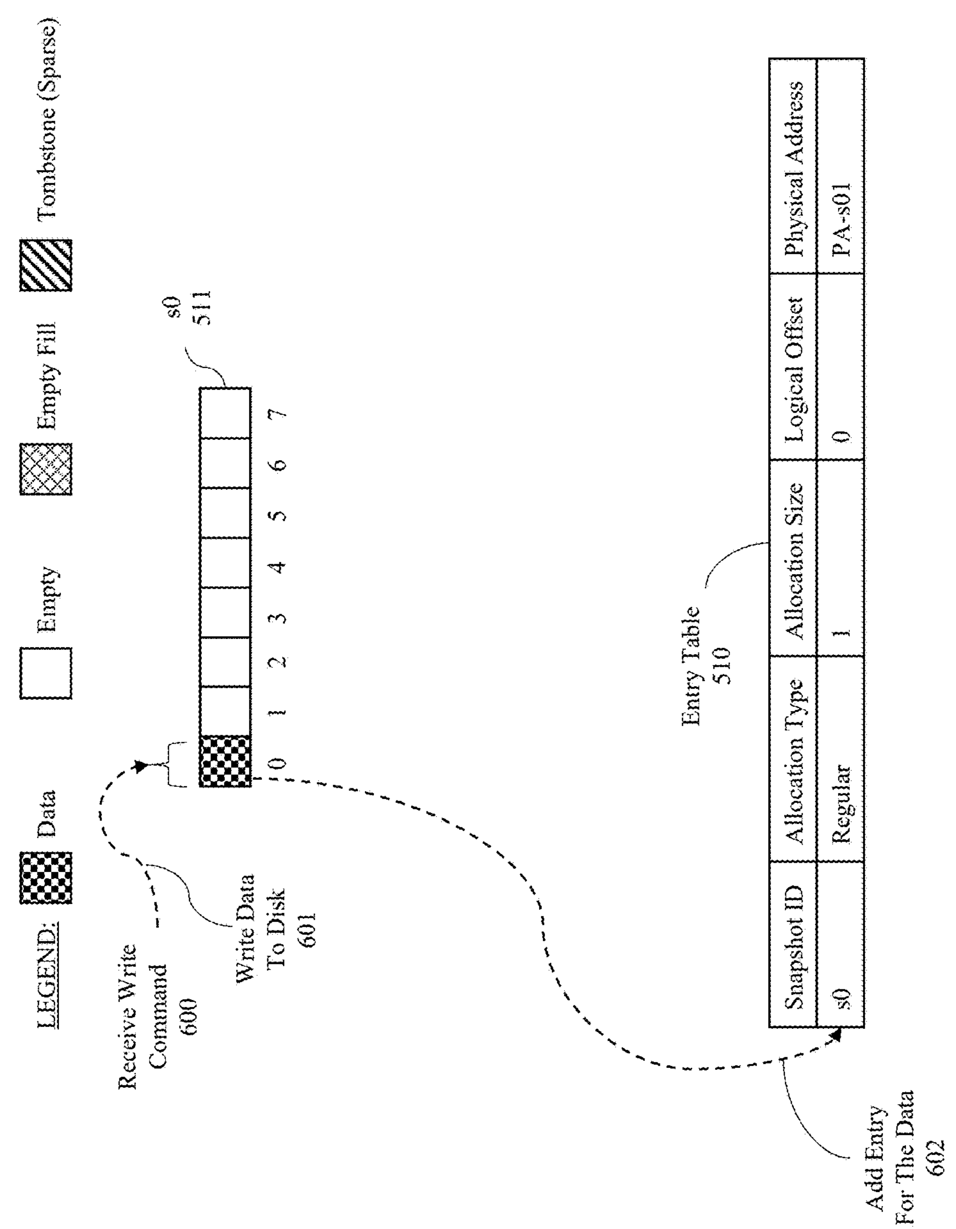
FIGS. 6A-6D provide an illustrative example of how a set of entries are generated, and a visual representation thereof, for an object illustrated in FIG. 5 according to some embodiments.

FIG. 6A illustrates the creation of a first entry at 602 for s0 (see 511). Such an entry is illustrated as being created in response to a write command received at 600 and is created after the corresponding data is written to disk (see 601). In some embodiments, upon initialization a corresponding extent would be created to specify that the object (e.g., extent) is sparse.

Figure 6B:
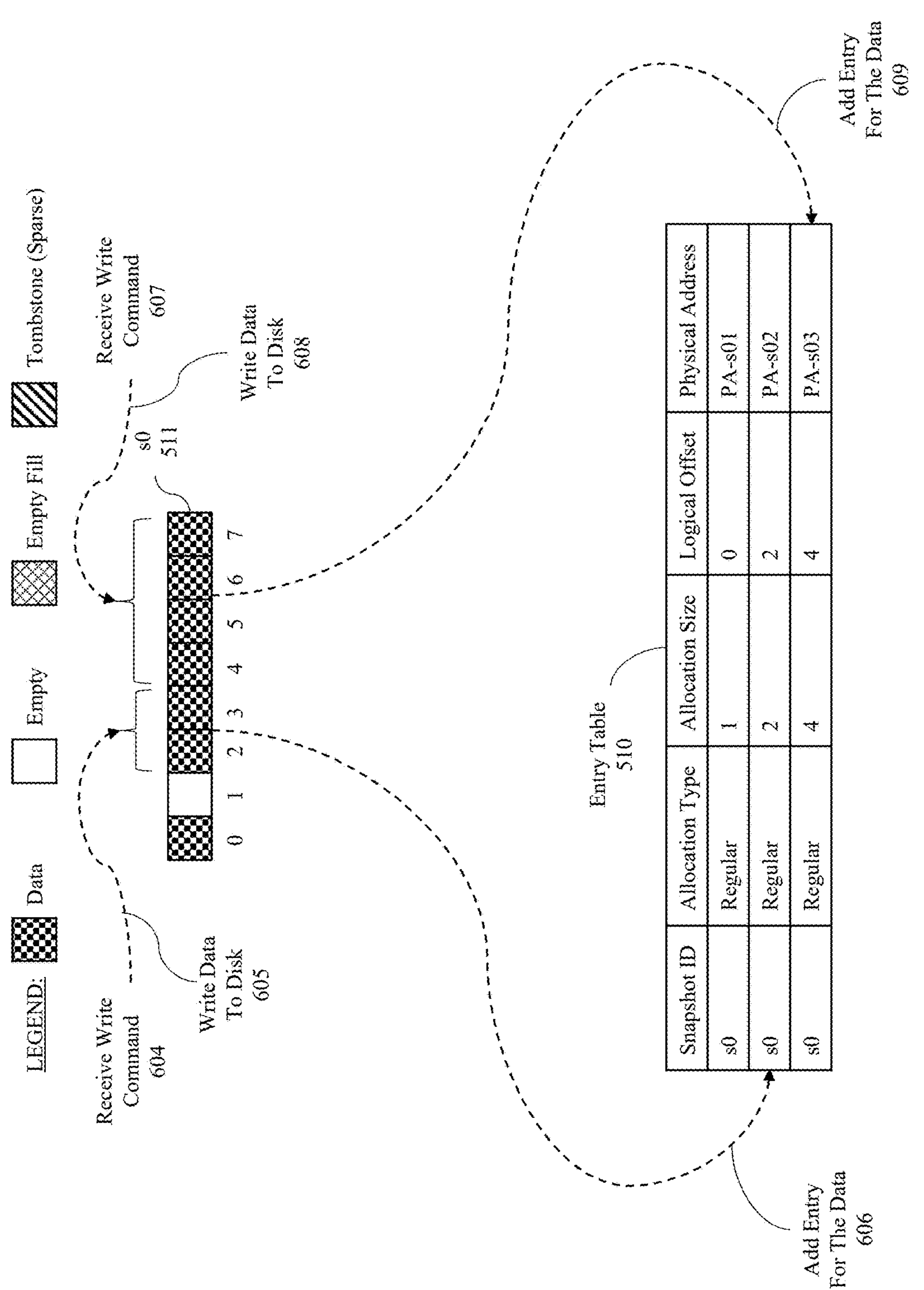

FIG. 6B illustrates the creation of a second and third entry at 606 and 609 respectively for s0. Such entries are illustrated as being created in response to a corresponding write command received at 604 and 605 respectively. Such entries would be created after the corresponding data is written to disk at 605 and 608 respectively.

Figure 6C:
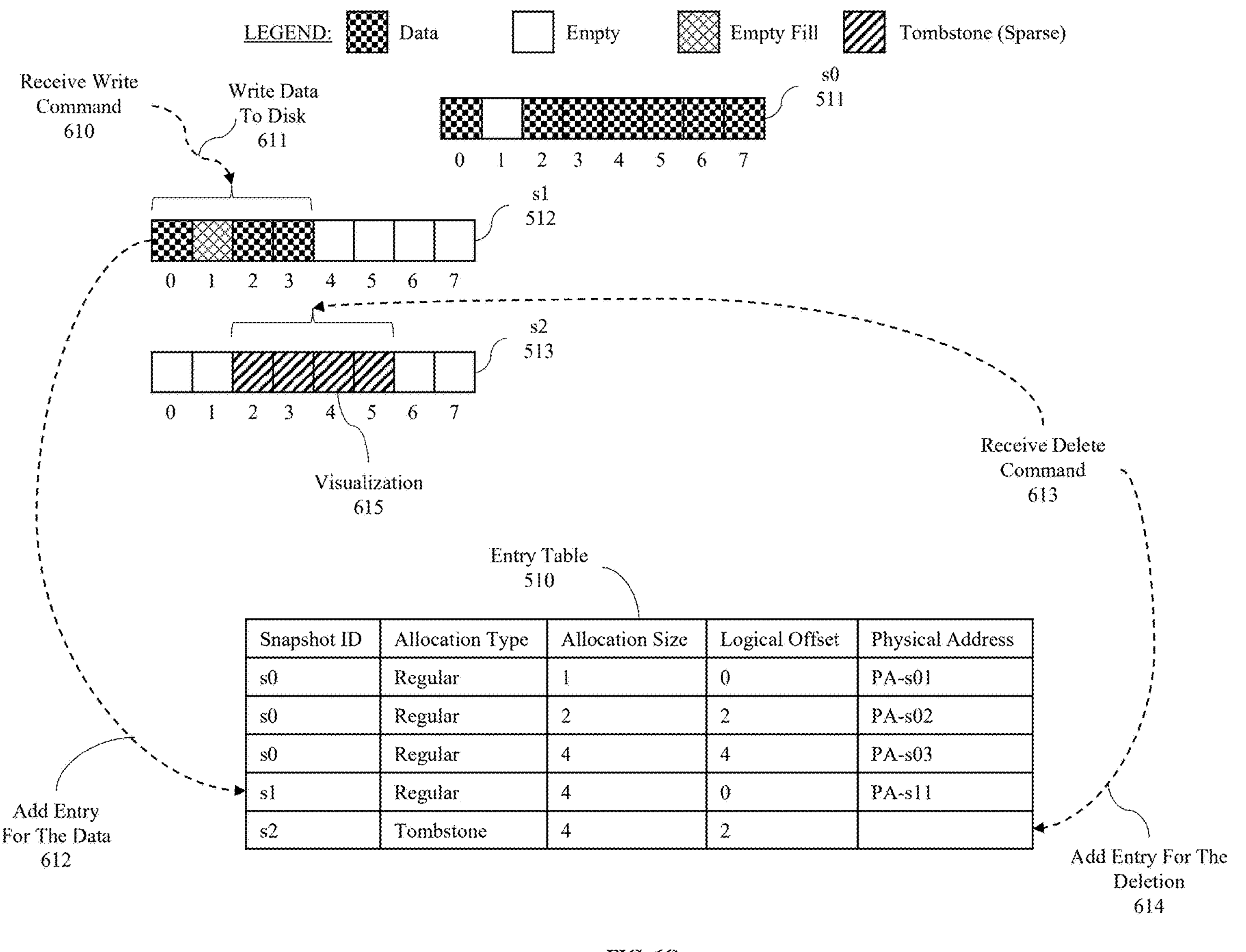

FIG. 6C illustrates the creation of an entry at 612 for a first child s2 of snapshot s0. Such an entry is illustrated as being created in response to a write command received at 610 and is created after the corresponding data is written to disk (see 611). At a later date, (e.g., after a clone of s1 is created) an entry at 614 for a child s2 of snapshot s1 is created. Such an entry is illustrated as being created in response to a delete command received at 613 (see visualization 615).

Figure 6D:
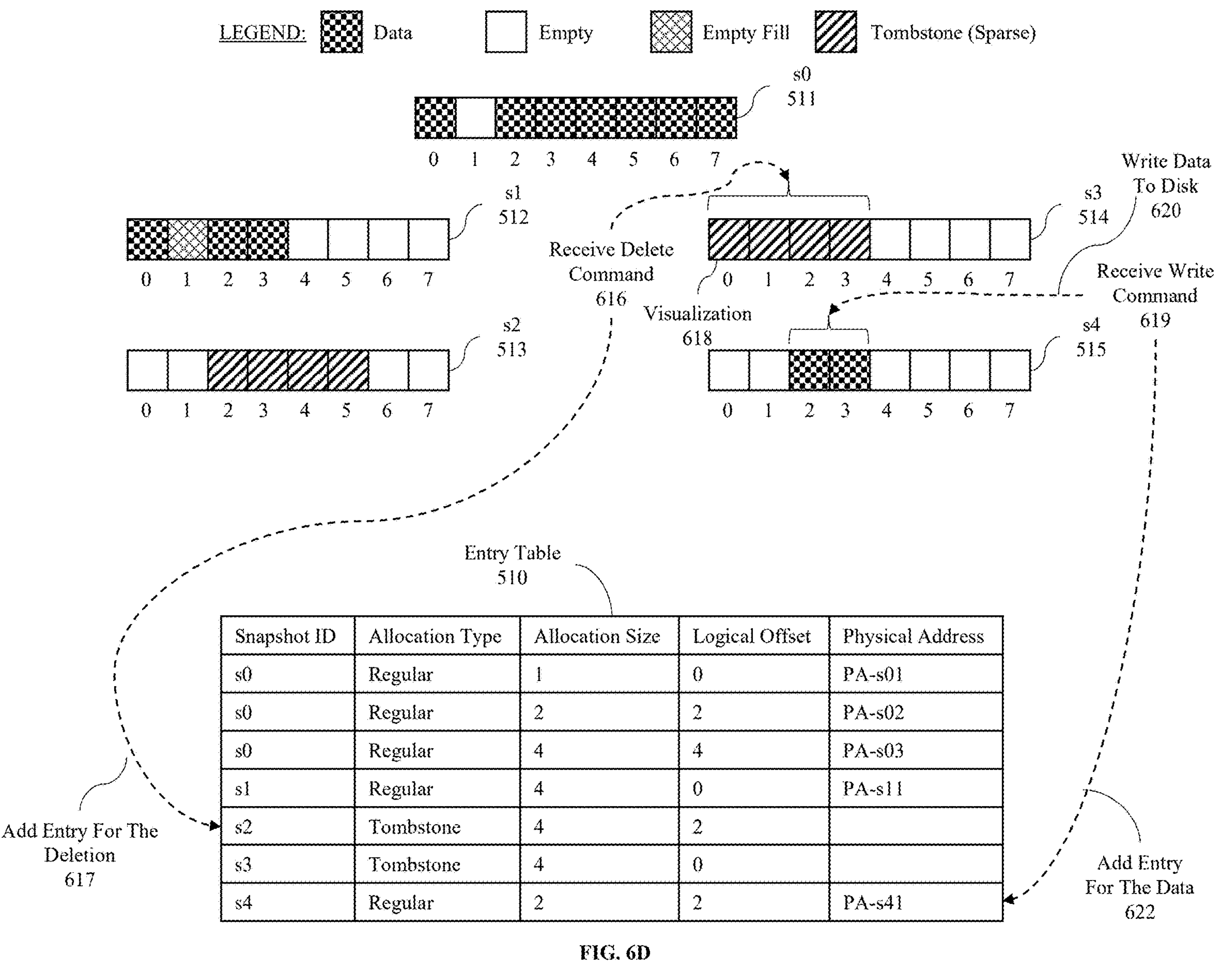

FIG. 6D illustrates the creation of an entry at 617 for a second child s3 of snapshot s0. Such an entry is illustrated as being created in response to a delete command received at 616 (see visualization 618). At a later date, (e.g., after a clone of s3 is created) an entry at 622 for a child s4 of snapshot s3 is created. Such an entry is illustrated as being created in response to a write command received at 619 and is created after the corresponding data is written to disk (see 620).

Figure 7A:
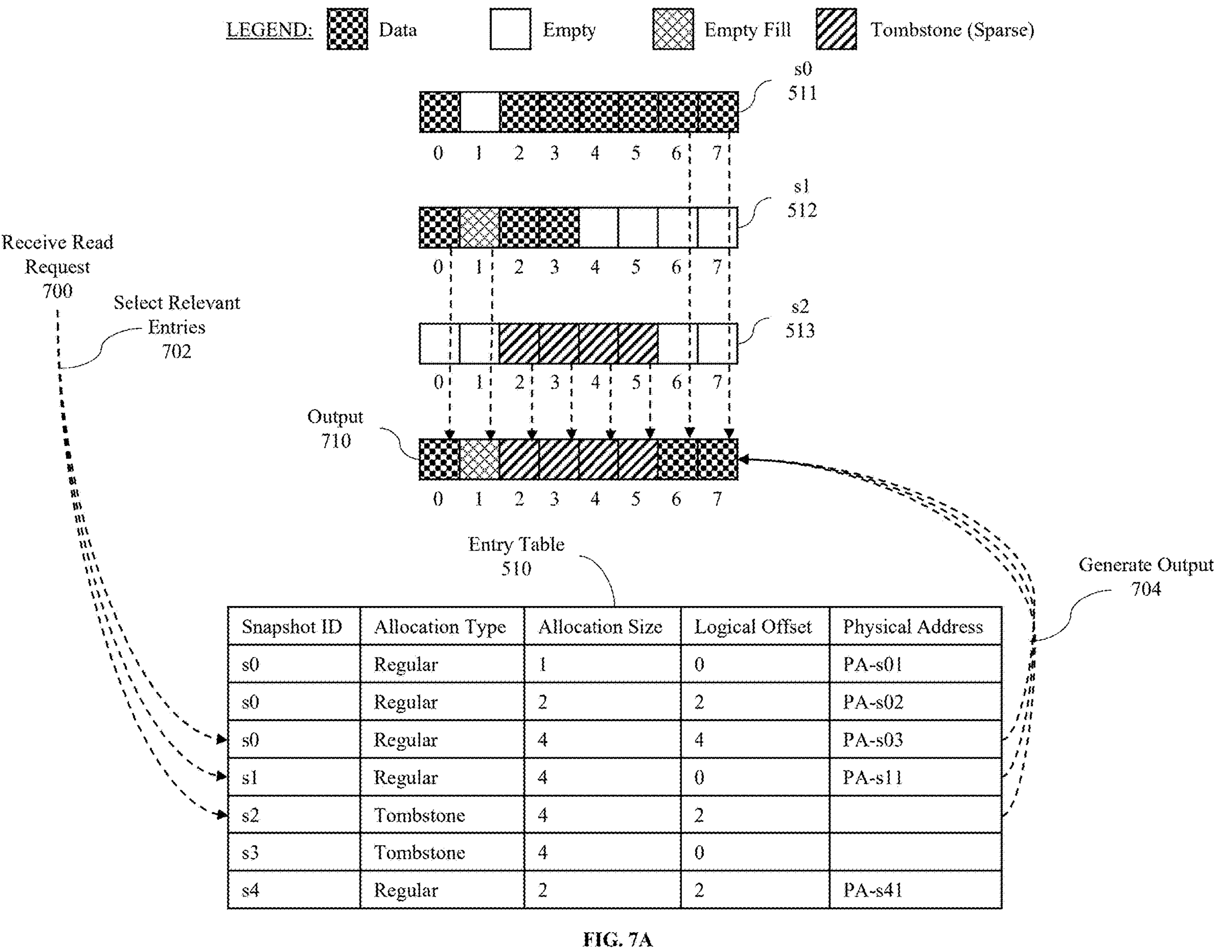
FIGS. 7A-7B provide an illustrative example of selection of segments in response to read requests, and a visual representation thereof, for an object illustrated in FIG. 5 according to some embodiments.
Figure 7B:
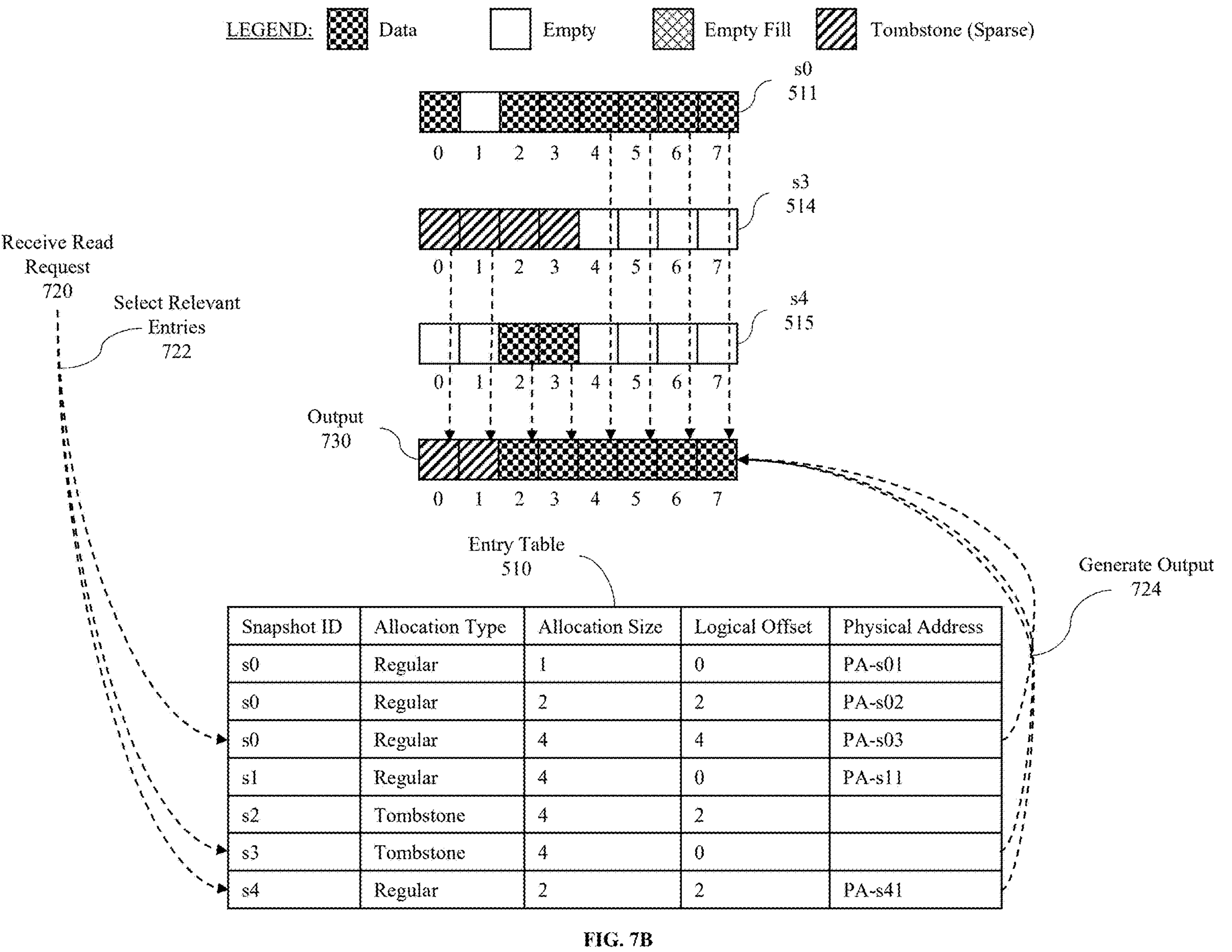

FIGS. 7A-7B provide an illustrative example of selection of segments in response to read requests, and a visual representation thereof, for an object illustrated in FIG. 5 according to some embodiments. The description of like identified elements discussed in regard to FIG. 5 are applicable to the present embodiment discussed in FIG. 7A-7B.

FIG. 7A illustrates the receipt and selection of corresponding segments in response to a read request 700. For example, the request can comprise a request to read all of the s2 object. Such a request would select relevant entries (see 702) and generate an output (see 710). For example, the process can first select the segments from s2 and place them in a buffer or corresponding representation (see e.g., selection of segments 2-5 from s2 into the output buffer 710). Subsequently, the immediate parent (see s1) is processed to select corresponding segments (see e.g., selection of segments 1-2 from s1 into the output buffer 710). Finally, the next parent (s0) is processed to select corresponding segments (see e.g., selection of segments 6-7 from s0 into the output buffer 710). As illustrated here, entries in the child override entries in the parent. Thus, a tombstone in the child overrides the data in the parent.

FIG. 7B illustrates the receipt and selection of corresponding segments in response to a read request 720. For example, the request can comprise a request to read all of the s4 object. Such a request would select relevant entries (see 722) and generate an output (see 730). For example, the process can first select the segments from s4 and place them in a buffer or corresponding representation (see e.g., selection of segments 2-3 from s4 into the output buffer 730). Subsequently, the immediate parent (see s3) is processed to select corresponding segments (see e.g., selection of segments 1-2 from s3 into the output buffer 730). Finally, the next parent (s0) is processed to select corresponding segments (see e.g., selection of segments 4-7 from s0 into the output buffer 730). Thus, a tombstone in the child overrides the data in the parent, but data in the child's child overrides the tombstone in the child's child.

System Architecture

Figure 8:
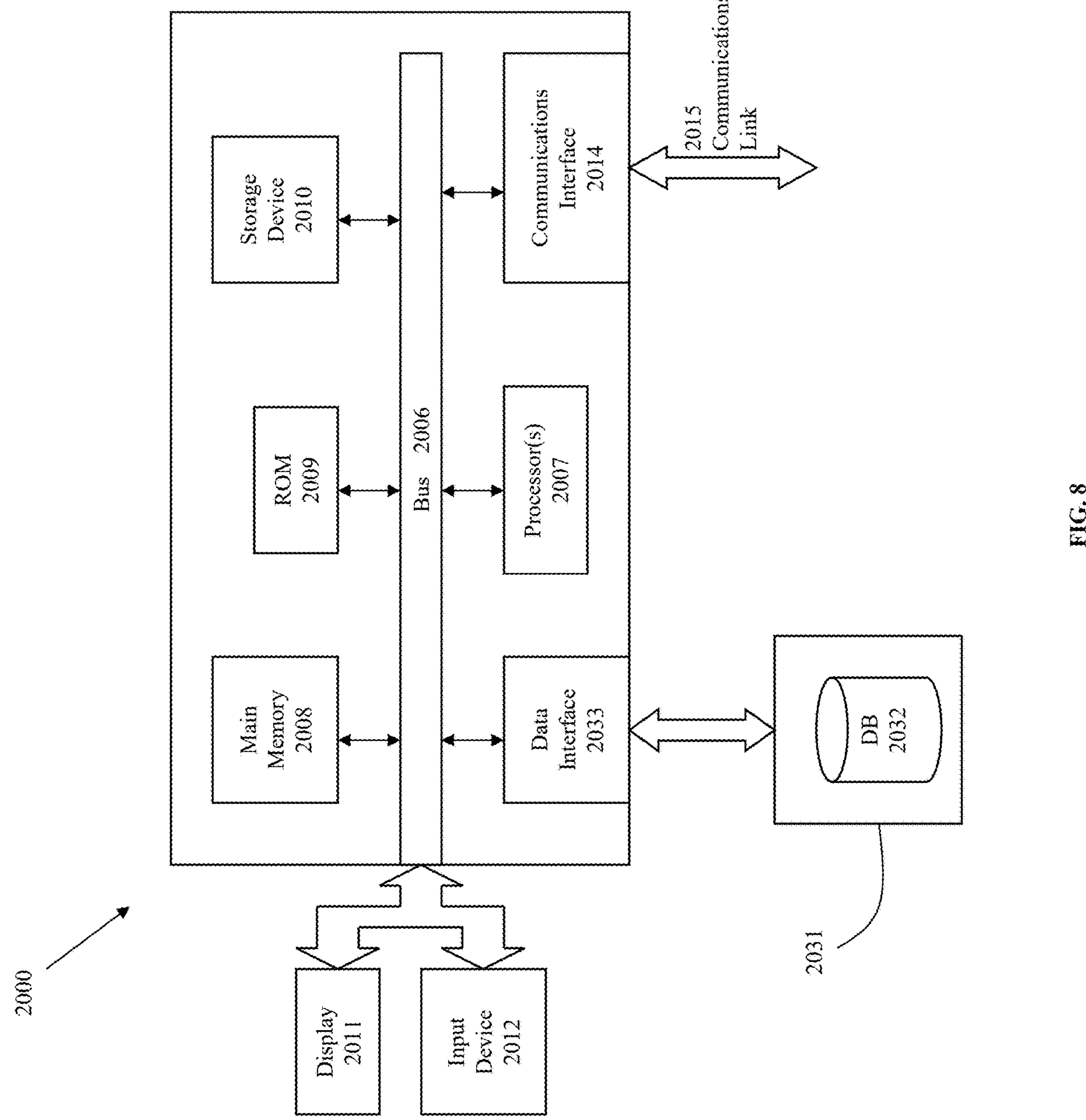
FIG. 8 is a diagram of a computing system suitable for implementing an embodiment of the present disclosure.

FIG. 8 is a block diagram of an illustrative computing system 2000 suitable for implementing an embodiment of the present invention. Computer system 2000 includes a bus 2006 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution. Data may be accessed from a database 2032 that is maintained in a storage device 2031, which is accessed using data interface 2033.

Figure 9:
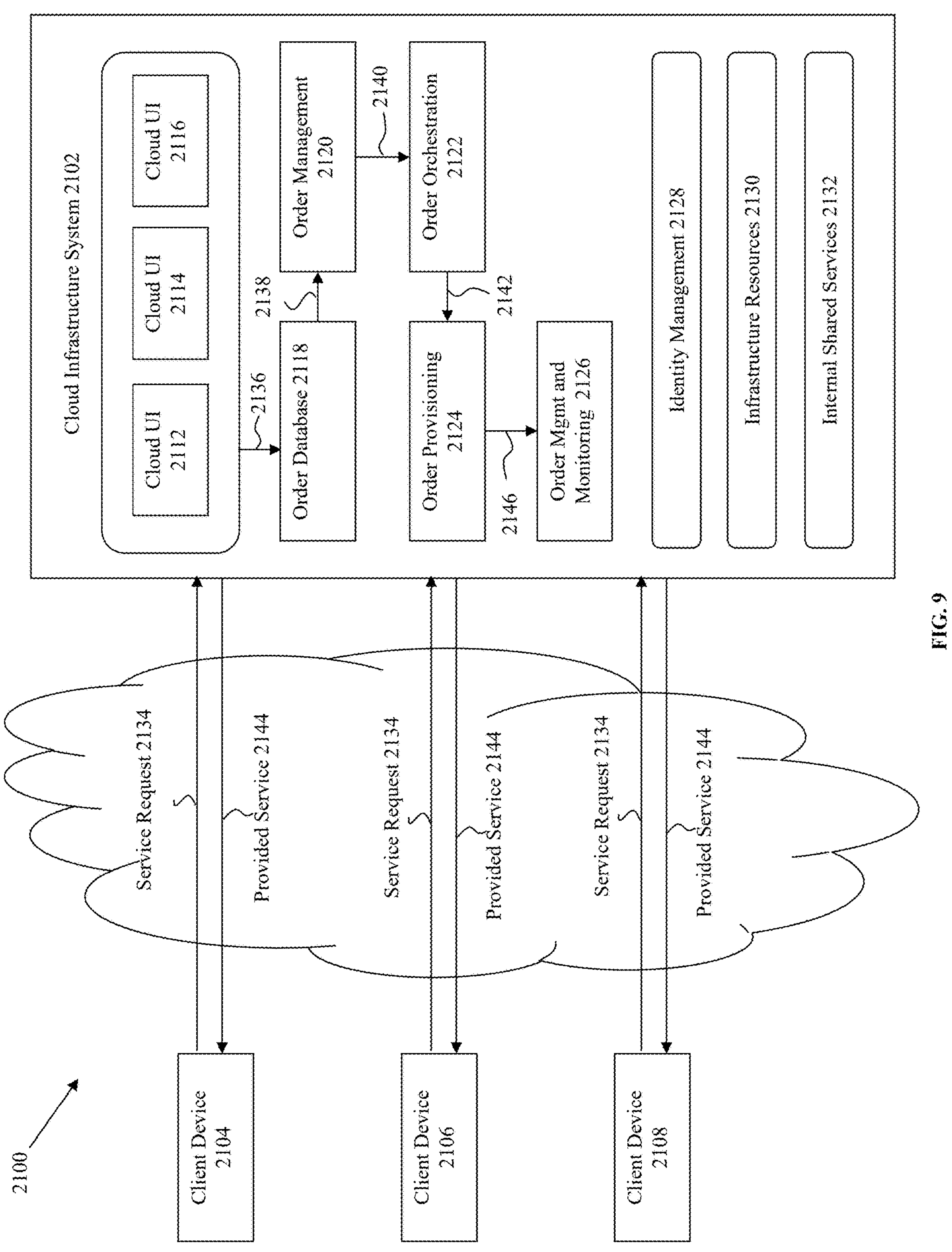
FIG. 9 is a block diagram of one or more components of a system environment in which services may be offered as cloud services, in accordance with an embodiment of the present invention.

FIG. 9 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application, or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Client computing devices 2104, 2106, and 2108 may be devices similar to those described above for FIG. 8. Although system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially available protocols. Cloud infrastructure system 2102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner.

In various embodiments, cloud infrastructure system 2102 may be adapted to automatically provision, manage and track a customer's subscription to services offered by cloud infrastructure system 2102. Cloud infrastructure system 2102 may provide the cloud services via different deployment models. For example, services may be provided under a public cloud model in which cloud infrastructure system 2102 is owned by an organization selling cloud services and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102. Cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order. At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2102 and the physical implementation layer that is used to provision the resources for providing the requested services. Order orchestration module 2122 may thus be isolated from implementation details, such as whether or not services and resources are provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2102 may include an identity management module 2128. Identity management module 2128 may be configured to provide identity services, such as access management and authorization services in cloud infrastructure system 2102. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for an approach to providing a distributed data store that addresses at least some of the issues of prior techniques suffer from, such as challenges to managing snapshots.

The invention claimed is:

1. A computer-implemented method, comprising:

maintaining a cluster comprising a plurality of nodes storing a plurality of objects, each object in the plurality of objects having an associated subset of metadata such that the plurality of objects has a plurality of subsets of metadata to manage data for respective objects of the plurality of objects, wherein individual storage units correspond to individual objects of the plurality of objects;

storing metadata for a storage unit corresponding to an object, and metadata for snapshots of the storage unit corresponding to the object, collocated within a same subset of metadata corresponding to the object; and processing access requests to data on at least one node in the plurality of nodes using the plurality of subsets of the metadata at least by, for each access request:

accessing a corresponding subset of metadata corresponding to a requested object of the access request to obtain extent information, wherein the extent information corresponds to one or more of the metadata for the storage unit or the metadata for a snapshot of the storage unit collocated in the subset of metadata corresponding to the access request; and executing an access operation, corresponding to the access request, on one or more portions of the data corresponding to the requested object, based on the extent information.

2. The computer-implemented method of claim 1, wherein data referenced by the metadata for the storage unit and the metadata for snapshots of the storage unit are stored on a same storage device.

3. The computer-implemented method of claim 1, wherein the metadata for the storage unit and the metadata for snapshots of the storage unit comprise a plurality of entries.

4. The computer-implemented method of claim 3, wherein an entry is identifiable by a snapshot identifier (ID) and corresponds to any one of a number of valid allocation sizes.

5. The computer-implemented method of claim 3, wherein an entry is a tombstone that does not have a corresponding storage allocation and represents a portion of the storage unit that can be generated using a fill value or a fill pattern.

6. The computer-implemented method of claim 3, wherein at least one access request comprises a request to perform a read operation on a snapshot of the storage unit, and the read operation is executed at least by: processing the plurality of entries to identify locations of one or more data segments stored on a storage device, wherein a first entry of the plurality of entries corresponds to the snapshot of the storage unit and a second entry of the plurality of entries corresponds to a parent snapshot to the snapshot of the storage unit.

7. The computer-implemented method of claim 3, wherein at least one access request comprises a request to perform a write operation on a snapshot of the storage unit, and the write operation is executed at least by: processing the plurality of entries to identify locations of one or more data segments stored on a storage device to be updated, wherein a first entry of the plurality of entries corresponds to the snapshot of the storage unit and a second entry of the plurality of entries corresponds to a parent snapshot to the snapshot of the storage unit, wherein the snapshot of the storage unit comprises a writable clone of the parent snapshot.

8. The computer-implemented method of claim 3, wherein at least one access request comprises a request to perform a delete operation on a snapshot of the storage unit, and the delete operation is executed at least by: processing the plurality of entries to identify one or more entries to be updated to reflect deletion of a previously referenced data segment stored on a storage device, wherein at least one of the one or more entries is changed to a tombstone entry that does not have a corresponding storage allocation and represents a portion of the storage unit that can be generated using a fill value or a fill pattern, and the snapshot of the storage unit comprises a writable clone.

9. A non-transitory computer readable medium having stored thereon a sequence of instructions which, when executed by a processor causes a set of acts comprising:

maintaining a cluster comprising a plurality of nodes storing a plurality of objects, each object of the objects in the plurality of objects having an associated subset of metadata such that the plurality of objects has a plurality of subsets of metadata to manage data for respective objects of the plurality of objects, wherein individual storage units correspond to individual objects of the plurality of objects;

storing metadata for a storage unit corresponding to an object, and metadata for snapshots of the storage unit corresponding to the object, collocated within a same subset of metadata corresponding to the object; and processing access requests to data on at least one node in the plurality of nodes using the plurality of subsets of the metadata at least by, for each access request:

accessing a corresponding subset of metadata corresponding to a requested object of the access request to obtain extent information, wherein the extent information corresponds to one or more of the metadata for the storage unit or the metadata for a snapshot of the storage unit collocated in the subset of metadata corresponding to the access request; and executing an access operation, corresponding to the access request, on one or more portions of the data corresponding to the requested object, based on the extent information.

10. The non-transitory computer readable medium of claim 9, wherein data referenced by the metadata for the storage unit and the metadata for snapshots of the storage unit are stored on a same storage device.

11. The non-transitory computer readable medium of claim 9, wherein the metadata for the storage unit and the metadata for snapshots of the storage unit comprise a plurality of entries.

12. The non-transitory computer readable medium of claim 11, wherein an entry is identifiable by a snapshot identifier (ID) and corresponds to any one of a number of valid allocation sizes.

13. The non-transitory computer readable medium of claim 11, wherein an entry is a tombstone that does not have a corresponding storage allocation and represents a portion of the storage unit that can be generated using a fill value or a fill pattern.

14. The non-transitory computer readable medium of claim 11, wherein at least one access request comprises a request to perform a read operation on a snapshot of the storage unit, and the read operation is executed at least by:

processing the plurality of entries to identify locations of one or more data segments stored on a storage device, wherein a first entry of the plurality of entries corresponds to the snapshot of the storage unit and a second entry of the plurality of entries corresponds to a parent snapshot to the snapshot of the storage unit.

15. The non-transitory computer readable medium of claim 11, wherein at least one access request comprises a request to perform a write operation on a snapshot of the storage unit, and the write operation is executed at least by:

processing the plurality of entries to identify locations of one or more data segments stored on a storage device to be updated, wherein a first entry of the plurality of entries corresponds to the snapshot of the storage unit and a second entry of the plurality of entries corresponds to a parent snapshot to the snapshot of the storage unit, wherein the snapshot of the storage unit comprises a writable clone of the parent snapshot.

16. The non-transitory computer readable medium of claim 11, wherein at least one access request comprises a request to perform a delete operation on a snapshot of the storage unit, and the delete operation is executed at least by:

processing the plurality of entries to identify one or more entries to be updated to reflect deletion of a previously referenced data segment stored on a storage device, wherein at least one of the one or more entries is changed to a tombstone entry that does not have a corresponding storage allocation and represents a portion of the storage unit that can be generated using a fill value or a fill pattern, and the snapshot of the storage unit comprises a writable clone.

17. A computing system comprising:

a memory to hold a set of instructions; and a computer processor to execute the set of instructions, which when executed cause a set of acts comprising:

maintaining a cluster comprising a plurality of nodes storing a plurality of objects, each object of the objects in the plurality of objects having an associated subset of metadata such that the plurality of objects has a plurality of subsets of metadata to manage data for respective objects of the plurality of objects, wherein individual storage units correspond to individual objects of the plurality of objects;

storing metadata for a storage unit corresponding to an object, and metadata for snapshots of the storage unit corresponding to the object, collocated within a same subset of metadata corresponding to the object; and processing access requests to data on at least one node in the plurality of nodes using the plurality of subsets of the metadata at least by, for each access request:

accessing a corresponding subset of metadata corresponding to a requested object of the access request to obtain extent information, wherein the extent information corresponds to one or more of the metadata for the storage unit or the metadata for a snapshot of the storage unit collocated in the subset of metadata corresponding to the access request; and executing an access operation, corresponding to the access request, on one or more portions of the data corresponding to the requested object, based on the extent information.

18. The computing system of claim 17, wherein data referenced by the metadata for the storage unit and the metadata for snapshots of the storage unit are stored on a same storage device.

19. The computing system of claim 17, wherein the metadata for the storage unit and the metadata for snapshots of the storage unit comprise a plurality of entries.

20. The computing system of claim 19, wherein an entry is identifiable by a snapshot identifier (ID) and corresponds to any one of a number of valid allocation sizes.

* * * * *